United States Patent Office 3,106,553
Patented Oct. 8, 1963

3,106,553
N-2-PROPYNYL ALKYLENEDIAMINES
Norman D. Dawson, Elkhart, Ind., assignor to Miles Laboratories, Inc., Elkhart, Ind., a corporation of Indiana
No Drawing. Filed Jan. 16, 1961, Ser. No. 82,705
7 Claims. (Cl. 260—247.5)

This invention relates to a series of new chemical compounds, and particularly to acetylenically unsaturated alkylenediamines and acid addition salts thereof, which possess valuable physiological properties. More specifically, the invention pertains to N-2-alkynyl-N,N'-substituted alkylenediamines and their pharmaceutically acceptable salts.

This application is a continuation-in-part of Serial No. 728,800, filed April 16, 1958, now abandoned.

The compounds of the present invention have the formula:

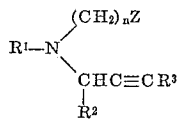

wherein $R^1$ represents an alkyl group containing from 1 to 8 carbon atoms, a halogenated lower alkyl group, for example, chloroethyl, an aryl or an aralkyl group; $R^2$ represents hydrogen, a lower alkyl group or an aryl group; $R^3$ represents hydrogen, a lower alkyl group or an alkenyl group; $n$ represents the cardinal numbers 2 or 3; and Z represents a heterocyclic amine radical or the group $NHR_4$, wherein $R_4$ may be an aryl, diaralkyl or a heterocyclic amine radical. These new compounds may be obtained as free bases having the formula given above, or preferably as acid addition salts and acids having pharmaceutically acceptable anions.

The acetylenically unsaturated substituted haloalkylamines used as starting materials for the preparation of the new N-2-alkynyl-N,N'-substituted alkylenediamines of the present invention are disclosed in my co-pending application, entitled "Acetylenic-Haloalkylamines," U.S. Serial No. 805,369, filed April 30, 1959, and assigned to the assignee of the present invention.

Under appropriate conditions the halogen atom in the tertiary haloalkylamine reacts with primary and secondary amines. Thus, moieties which are part of many physiologically active compounds can be introduced into the molecule. The reaction between the tertiary haloalkylamine and the primary or secondary amines is readily effected by refluxing the reactants for 1 to 4 hours in ethanol or isopropanol or other suitable inert solvent, using a molecular excess of the reacting amine to bind the hydrogen halide formed in the condensation.

This reaction may be illustrated by means of the following equation:

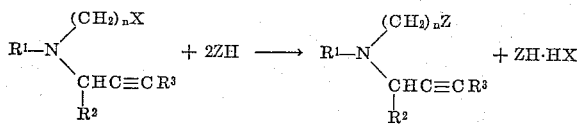

wherein $R^1$, $R^2$, $R^3$, $n$, and Z have the meanings ascribed to them above and X is halogen.

Isolation and purification of the new alkylenediamines and formation of their acid addition salts is best achieved by cooling the reaction mixture, diluting it with an equal volume of ether, filtering out the aryl, diaralkyl or heterocyclic amine salt, such as amine hydrochloride, treating the clear filtrate with ethereal hydrogen chloride, and obtaining the desired salt by recrystallization from hot isopropanol. Product work-up by related procedures is also feasible as is obvious to those skilled in the art, and such other methods are equally within the purview of this invention.

The acetylenically unsaturated alkylenediamines of this invention and their salts are useful as anti-histamines.

This invention is illustrated by the following examples which, it is to be understood, are merely illustrative and should not be taken in a limiting sense.

EXAMPLE 1

N-2-Propynyl-N-Isopropyl-2-Chloroethylamine

To a flask was charged 165 g. (1.27 mole) of N-2-propynyl-N-isopropyl-2-aminoethanol in 200 ml. of chloroform and treated dropwise with 150 g. (1.27 mole) of thionyl chloride in 100 ml. of chloroform. During the addition the reaction mixture was kept cool in an ice bath to control the exothermic reaction. There was a color change from pale yellow to dark brown. The mixture was then refluxed from 1½ hours. Excess thionyl chloride and chloroform were stripped off, leaving a thick brown oil to which an equal volume of water was added and which was made strongly basic with sodium hydroxide. The two layers that formed were separated, the aqueous layer being extracted with benzene. The benzene was stripped, and the residual oil distilled at 90–94° C./water pump vacuum. Upon redistillation the desired free base compound was collected at 38–40° C./.2 mm. of mercury. Yield: 146 g. (79% of theory).

EXAMPLE 2

N-2-Propynyl-N-Isopropyl-N'-Benzhydrylethylenediamine Dihydrochloride

A solution of 16 g. (0.1 mole) of N-2-propynyl-N-isopropyl-2-chloroethylamine (prepared as described in Example 1) and 36.8 g. (0.2 mole) of benzhydrylamine in 150 ml. of diethyl ether was refluxed for 2½ hours with no apparent reaction. The ether was replaced by an equal volume of ethanol followed by a two hour reflux period. The reaction mixture was cooled and diluted with an equal volume of ether and allowed to stand at room temperature over the weekend. The mixture was filtered free of benzhydrylamine hydrochloride and the clear filtrate treated with an excess of ethereal hydrogen chloride. The colorless crystals which were obtained after recrystallization from isopropanol melted at 181–182° C. with decomposition. Yield: 75% of theory. The compound analyzed satisfactorily for nitrogen (Kjeldahl). Calc. 7.45%, found 7.02%.

EXAMPLE 3

N-2-Propynyl-N-Isopropyl-N'-Phenylethylenediamine

N-2-propynyl-N-isopropyl-N'-chloroethylamine (32 g., 0.2 mole) (see Example 1) and aniline (37.2 g., 0.4 mole) in 175 ml. of isopropanol were refluxed for 3 hours. After standing overnight at room temperature the reaction mixture was stripped of excess solvent, leaving a dark brown oil. An equal volume of water was added thereto and the solution was made strongly basic with sodium hydroxide. The two layers which formed were separated and the aqueous layer was extracted with diethyl ether four times. The extracts were combined with the oil layer and the diethyl ether removed by stripping, leaving a brown oil admixed with some water and unreacted aniline. The mixture was steam-distilled to remove the aniline, and the residue was a dark brown oil to which 400 ml. of Skelly "B" was added. A small amount of brown crystals falling out were discarded. The compound was then stripped of Skelly "B" and distilled. A clear yellow oil, the free base compound, was collected at 140–155° C./2.5 mm. of mercury. Yield: 25 ml. (58% of theory). Nitrogen analysis: 12.95% calculated, 11.83% found.

EXAMPLE 4

*N-2-Propynyl-N-Isopropyl-N'-2-Thiazolylethylenediamine Dihydrochloride*

A solution of 16 g. (0.1 mole) of N-2-propynyl-N-isopropyl-2-chloroethylamine (see Example 1) and 20 g. (0.2 mole) of 2-aminothiazole in 150 ml. of isopropanol was refluxed for three hours. The reaction mixture was cooled, diluted with an equal volume of ether and filtered free of a light tan solid which melted at 127–132° C. The tan solid, which was the monohydrochloride, was triturated with a mixture of ethereal hydrogen chloride and acetone to give the dihydrochloride compound. The colorless material obtained by recrystallization from ethanol melted at 216–218° C. with decomposition. The yield was 24 g. (81% of theory). The compound analyzed as follows: Calculated for C, 44.59%; found 44.32%, for H, 6.47% and 7.12%.

EXAMPLE 5

*N-2-Propynyl-N-Isopropyl-N'-2-Pyridylethylenediamine Trihydrochloride*

A slurry of 16 g. (0.1 mole) of N-2-propynyl-N-isopropyl-2-chloroethylamine (see Example 1) and 18.8 g. (0.2 mole) of 2-aminopyridine in 175 ml. of isopropanol was charged to a suitable flask and refluxed for 4 hours. The compound was covered with a solution of diethyl ether, and saturated with hydrogen chloride. A tan oil semi-solid material settled out. The excess solvent and diethyl ether were decanted, and after several applications of fresh isopropanol and triturations the oily semi-solid became crystalline. The desired white crystals were obtained by recrystallization from a hot ethanol-ethyl acetate solution. Yield 3 g. (11% of theory); melting point: 209–210° C. with decomposition. Nitrogen analysis: 14.5% (calculated, 14.31% (found).

EXAMPLE 6

*2-(N-2-Propynyl-N-Isopropyl-Amino)-Ethylpiperidine Dihydrochloride*

A solution of 16 g. (0.1 mole) of N-2-propynyl-N-isopropyl-2-chloroethylamine (see Example 1) and 17 g. (0.2 mole) of piperidine in 100 ml. of isopropanol was refluxed for one hour, the mixture cooled and filtered free of piperidine hydrochloride. The filtrate was treated with ethereal hydrogen chloride, and the resulting oily semi-solid crystallized when triturated with isopropanol to which a little acetone had been added. The solid product obtained was then collected by suction filtration, washed with a little acetone, dried and recrystallized from isopropanol to yield the desired crystalline dihydrochloride which melted at 186–188° C. The carbon-hydrogen analysis was respectively as follows 55.51% and 9.31% calculated and 55.18% and 9.30% found.

EXAMPLE 7

*2-(N-2-Propynyl-N-Isopropylamine)-Ethylmorpholine Dihydrochloride*

A slurry of 16 g. (0.1 mole) of N-2-propynyl-N-isopropyl-2-chlorethylamine (see Example 1) and 17 g. (0.2 mole) of morpholine in 150 ml. of isopropanol were refluxed for two hours. It was then cooled to room temperature, and a crop of crystals formed which were filtered out. By means of another recrystallization from hot isopropanol the desired crystalline dihydrochloride was obtained. Yield: 17.2 g. (60% of theory); melting point: 197–198° C. with decomposition.

The preferred primary or secondary amines which are reacted with the acetylenically unsaturated tertiary haloalkylamines to produce the alkylenediamine compounds of this invention are benzhydrylamine, aniline, 2-aminothiazole, 2-aminopyridine, piperidine, and morpholine, and these reactants may be used in the preparation of the preferred species within the purview of this invention.

In addition to the use of the acetylenically unsaturated tertiary haloalkylamines disclosed in the foregoing examples, the preferred primary or secondary amines above noted may be reacted with various other acetylenically unsaturated tertiary haloalkylamines. For example, to name but a few, the following compounds which are disclosed in my aforementioned co-pending application Serial No. 805,369, and which may be prepared in analogous fashion to the compound may also be used as the starting materials of this invention.

(1) N-benzyl-N-2-propynyl-2-chloroethylamine,
(2) N-isobutyl-N-2-propynyl-2-chloroethylamine,
(3) N-t-octyl-N-2-propynyl-2-chloroethylamine,
(4) N - isopropyl - N - (1 - n - propyl - 2 - propynyl) - 2-chloroethylamine,
(5) N - benzyl - N - (1 - benzyl - 2 - propynyl) - 2 - chloroethylamine,
(6) N - benzyl - N - (1 - n - propyl - 2 - propynyl) - 2 - chloroethylamine,
(7) N-isopropyl-N-2-butynyl-2-chloroethylamine,
(8) N - isopropyl - N - (4 - methyl - 4 - penten - 2 - ynyl)-2-chloroethylamine,
(9) N-benzyl-N-2-propynyl-3-chloropropylamine,
(10) N - benzyl - N - (1 - n - propyl - 2 - propynyl) - 3 - chloropropylamine, and
(11) N-isobutyl-N-2-heptynyl-3-chloropropylamine.

Reaction of these acetylenically unsaturated tertiary haloalkylamines with various primary and secondary amines may be readily achieved by means of the procedures illustrated in the foregoing examples.

In summary, this invention related to N-2-alkynyl-N,N-'-substituted alkylenediamines according to the general formula given above and acid addition salts of these compounds with pharmaceutically acceptable acids. These compounds display useful anti-histaminic properties.

What is claimed is:

1. A new composition of matter selected from the group consisting of N-2-alkynyl-N,N'-substituted alkylenediamines of the formula:

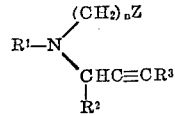

wherein $R^1$ is a member selected from the group consisting of alkyl containing from 1 to 8 carbon atoms, chloroethyl, and benzyl; $R^2$ is a member selected from the group consisting of hydrogen, lower alkyl and benzyl; $R^3$ is a member selected from the group consisting of hydrogen, lower alkyl, and isopropenyl; $n$ is a member selected from the group consisting of the cardinal numbers 2 and 3; and Z is a member selected from the group consisting of N-piperidyl, N-morpholinyl and $NHR^4$, wherein $R^4$ is a member selected from the group consisting of benzhydryl, phenyl, 2-thiazolyl, phenylethyl and 2-pyridyl, and acid addition salts of said compounds having pharmaceutically acceptable ions.

2. N - 2 - propynyl-N-isopropyl-N'-benzhydrylethylenediamine.

3. N - 2 - propynyl-N-isopropyl-N'-phenylethylenediamine.

4. N- 2 - propynyl-N-isopropyl-N'-2-thiazolylethylenediamine.

5. N-2-propynyl-N-isopropyl-N'-2-pyridylethylenediamine.

6. 2-(N-2-propynyl-N-isopropyl-amino)-ethylpiperidine.

7. 2-(N-2-propynyl-N-isopropylamino)-ethylmorpholine.

References Cited in the file of this patent

UNITED STATES PATENTS

| | | |
|---|---|---|
| 1,752,617 | Schulemann et al. | Apr. 1, 1930 |
| 2,440,703 | Sondern et al. | May 4, 1948 |
| 2,739,981 | Szabo et al. | Mar. 27, 1956 |